Dec. 1, 1942.     R. R. LAW     2,303,563
CATHODE RAY TUBE AND LUMINESCENT SCREEN
Filed May 9, 1941
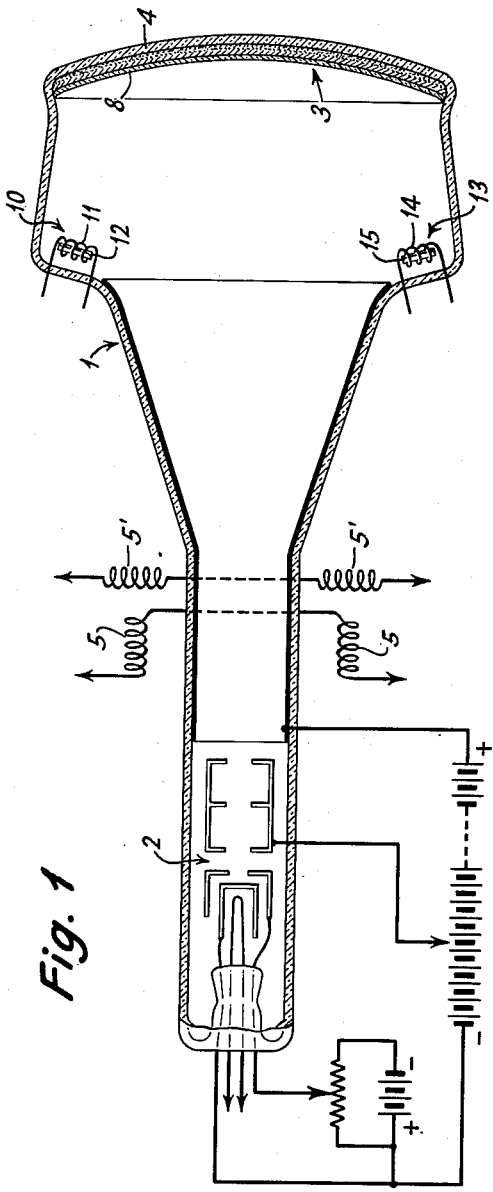
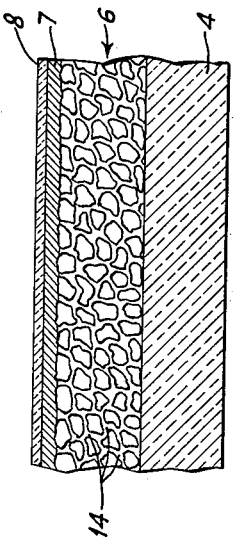
INVENTOR.
RUSSELL R. LAW
BY Charles McClair
ATTORNEY.

Patented Dec. 1, 1942

2,303,563

UNITED STATES PATENT OFFICE 2,303,563

CATHODE RAY TUBE AND LUMINESCENT SCREEN

Russell R. Law, Chatham, N. J., assignor to Radio Corporation of America, a corporation of Delaware Application May 9, 1941, Serial No. 392,626

9 Claims. (Cl. 250—164)

My invention relates to cathode ray tubes and luminescent screens used in combination with such tubes, and particularly to luminescent screens such as of the sulphide type used in tubes of the magnetically deflected type.

In cathode ray tubes of conventional design which incorporate a luminescent phosphor screen and particularly when such screens include sulphide phosphors ionic bombardment of the screen produces blemishes which are detrimental, especially in tubes of thus type used for television purposes. Negative ions originating near the cathode are subjected to the same focusing and deflecting forces as the electrons but because of their smaller charge-to-mass ratio they are not deflected and focused to the same degree as electrons, especially where magnetic fields are used to deflect the electrons over the screen. In tubes utilizing electrostatic focusing of the electron beam and two-way magnetic deflection of the beam, these ions penetrate the active centers of the phosphor screen and produce a small intense dark spot usually referred to as "ion spot" directly in line with the axis of the electron gun. Positive ions near the luminescent screen also cause diffuse blemishes known as "smudge." Such positive ions may be drawn to the screen by local potential gradients arising from irregularities in the secondary electron emission characteristics of the screen. Inasmuch as ion spot and smudge become more pronounced as the tube is used, they are important factors in determining the useful life of the tube.

Various means of reducing ion formation have been proposed, as well as means to deflect the electrons and ions off the screen, subsequently returning only the electrons to the screen. While the ultimate solution of the problem appears to be that of obtaining a substantially perfect vacuum to prevent formation of ions, the various electrodes and component parts within the tube retain some gas which is liberated during use. Even when tubes are evacuated at high temperatures and over long periods of time, the residual gas is sufficient to cause screen burning and resultant ion spot and smudge discolorations during life of the tube.

It is an object of my invention to provide a luminescent phosphor screen which is resistant to the formation of ion spot and smudge. It is another object to provide a screen impenetrable to ions which otherwise cause discoloring effects, and it is a still further object to provide a tube having a sulphide phosphor screen wherein ionic charges may be neutralized without propagation into the centers of the sulphide. In accordance with my invention, I provide a luminescent phosphor screen with means to absorb ionic energy which is substantially transparent to electrons but opaque to ions in combination with means to prevent migration of ions into the luminescent active centers of the phosphor. These and other objects, features and advantages of my invention will become apparent when considered in view of the following description and the accompanying drawing in which:

Figure 1 is a longitudinal view of a cathode ray tube incorporating a screen made in accordance with my invention, and Figure 2 is an enlarged fragmentary view of a portion of the screen in the tube of Figure 1.

In the illustrative embodiment of my invention shown in Figure 1 the tube comprises an elongated envelope or bulb 1 which is highly evacuated and has at one end thereof an electron gun 2 to develop an electron beam and direct the beam upon a luminescent phosphor target or screen assembly 3. As shown in Figure 1, the screen assembly 3 may be deposited directly on the inner surface of the wall 4 of the envelope, although a separate foundation corresponding to the wall 4 and bearing the luminescent phosphor screen, may be provided with the screen facing the electron gun 2.

The electron gun 2 is of the conventional type and comprises the usual cathode, electron control element or grid, a first anode maintained positive with respect to the cathode and a second anode to focus and direct the electrons from the cathode upon the luminescent screen assembly 3. Obviously, other types of electron guns may be used, either those of the type shown utilizing electrostatic focusing or those for use in combination with magnetic focusing means. As indicated above, ion spot formation occurs predominantly in tubes incorporating sulphide screens and magnetic deflection means, such as the deflection coils 5 and 5', although it is to be understood that my invention is not limited to tubes utilizing such deflection but is equally applicable to tubes of the electrostatically deflected type wherein ion spot is a minimum but the smudge effects nevertheless occur. Sulphide phosphor screens including zinc sulphide, and especially screens including cadmium or zinc-cadmium sulphides, are subject to very rapid ion spot formation and my invention is particularly effective in minimizing or substantially preventing such formation on such sulphide phosphors. However, although my invention is particularly applicable in combination with sulphide phosphor screens or screens incorporating sulphides, it is not limited to such use.

In accordance with my invention the luminescent phosphor screen assembly 3 comprises a coating 6 on the wall 4 of a phosphor material which may be of any of the well-known types, such as zinc sulphide, cadmium or zinc cadmium sulphides, zinc silicate, zinc beryllium silicate, or various other sulphide or silicate phosphors or combinations, either as mixtures or as individual layers of such phosphors. In conventional tubes the coating of luminescent material is directly exposed to electron bombardment of electrons from the gun, whereas in accordance with my invention I protect the bombarded surface of the luminescent coating with a combination of materials, one of which absorbs the ionic energy and another of which prevents migration of the ions to the active centers of the phosphor material, while at the same time maintaining a very high transparency to the electrons producing the useful activation of the phosphor component of the screen.

To explain my invention and the substantial elimination of ion spot and smudge discolorations I have computed the following data which shows the relative penetration of various charged particles and the approximate penetration in a phosphor, such as zinc silicate bombarded by particles at a velocity corresponding to 10,000 volts.

| Particle | Charge | Relative penetration | Penetration in $Zn_2SiO_4$ at 10 kv. |
|---|---|---|---|
|  |  | Per cent | Angstroms |
| Electron | − | 100 | 25,000 |
| $H_1$ ion | ± | 0.05 | 13.6 |
| $O_2$ ion | ± | 0.004 | 1.1 |
| Na ion | ± | 0.002 | 0.6 |
| Cl ion | ± | 0.0015 | 0.4 |

It has been generally believed that the surface layers of luminescent phosphor particles are relatively inactive and actual measurements indicate that the surface layer which, upon becoming discolored or burnt resulting in the ion spot or smudge, is about 30 atomic layers thick. From the above tabulation, however, it would appear that even the hardest bombarding ions, such as the hydrogen ions at a potential of 10,000 volts can penetrate zinc silicate only a distance of approximately 14 Angstroms, which corresponds to about 7 atomic layers. While I do not wish to be limited to a particular theory, it appears that the ions must continue to travel by migration through the crystal lattice and into the active centers of the phosphor material after the ions have expanded their bombarding energy in that portion of the phosphor adjacent the bombarded surface. Therefore in accordance with my invention, I provide a layer of material having a thickness of 20 to 100 Angstroms of a substance which absorbs the ionic bombarding energy, and in addition, I provide an intermediate relatively thin ion barrier layer to arrest the ion migration and prevent the ions from entering the luminescent particles. Each of these layers are non-luminescent and do not add to the luminescence of the phosphor screen. For example, the ion migration barrier layer may comprise a substance which reacts chemically with the migrating ions; the barrier layer may offer high resistance to migration of the ions, or the barrier-phosphor interface may inhibit migration. Thus materials such as barium, aluminum, or caesium may be used as an ion migration barrier which will react chemically with the migrating ions. To provide high resistance to ion migration use may be made of a layer of beryllium, silicon, or aluminum or other material having a closely packed molecular structure. Migration may also be inhibited by providing discontinuity in the crystal lattice at the interface between the phosphor and the ion energy absorbing layer.

Referring again to Figure 2, the phosphor coating 6 is therefore provided with a coating or layer 7 which substantially prevents migration of the ions, chemically reacts with migrating ions or inhibits ion migration. This layer 7 may comprise a layer of metal which is of insufficient thickness to absorb the electron beam. A 5 or 10 molecule thick layer of aluminum or other material chosen as indicated above may be used for this purpose. While a thin layer of metal is desired, inasmuch as its use enables dissipation or equalization of the ionic charges over the entire screen area, other materials having small atomic radii such as lithium or beryllium fluoride, beryllium nitride and silicon carbide or dioxide may be used to form the layer 7. The atomic radii of such materials are sufficiently small to substantially prevent migration of the ions and such materials when vaporized and condensed are very dense thus minimizing the formation of voids through which the ions can pass.

To absorb the ionic energy I provide a second or energy absorbing layer 8 deposited directly on the migration preventing layer 7. The thickness of the layer 8 is preferably greater than that of the migration preventing layer 7, and may range from 10 to 50 molecules in thickness for an electron beam of 10,000 volts velocity. The thickness of the material of the layer 8 is proportional to the volt velocity of the ions formed by the electron beam although some ions formed adjacent the screen such as by secondary electrons may have a velocity less than the electrons of the beam. Thus the layer 8 may be from 2 to 5 times the thickness of the intermediate layer 7 for beam velocities up to 10,000 volts although for higher beam velocities a molecular thickness of from 1 to 5 per thousand volts velocity is desirable. The material of the layer 8 may be of almost any electron permeable material compatible with maintenance of high vacuum within the tube but I have found aluminum oxide particularly suitable when deposited on the layer 7 from the vapor state.

In the construction of tubes made in accordance with my invention the layers 7 and 8 are preferably applied following the assembly of the luminescent coating 6 within the envelope during or subsequent to the final evacuation of the envelope. For this purpose I provide a series of widely spaced metal evaporators only one of which is shown at 10 within the envelope or bulb 1. Each of the evaporators may comprise a highly refractory metal filament 11, such as tungsten, supporting the metal 12 to be evaporated. Following evacuation of the envelope and preferably under a residual atmospheric pressure of less than 5 microns (Hg), the filaments 11 are heated such as by the flow of an electric current to the vaporizing temperature of the metal 12, whereupon a portion of this metal is evaporated and deposited upon the luminescent phosphor coating 6. The evaporators 10 are widely spaced from the luminescent coating 6 so that a substantially uniform layer 7 of metal will be formed and the residual pressure is maintained below the value indicated so that the resulting layer is relatively dense rather than porous.

A second series of evaporators one of which is shown at 13 are provided within the envelope for depositing the material comprising the energy absorbing layer 8. Each of these evaporators may likewise comprise a refractory metal filament 14 coated with or bearing the material 15 of which the layer 8 is to be composed which, in the example given above, is preferably aluminum oxide. Here again the material 15 should be evaporated under a very low residual pressure to provide a relatively dense energy absorbing layer. It is for this reason that it is not desirable to form a relatively thick ion migration preventing layer and then oxidize a portion of this layer, inasmuch as an oxide formed in this manner is relatively fluffy and not as dense as that provided by vaporization and condensation at low residual pressures.

While I have specifically referred to aluminum and aluminum oxide layers, it will be appreciated that there is no correlation between the metal and metal oxide. For example, aluminum is here chosen because of its high electron transparency and the aluminum oxide because of its high ion absorbing properties and ease of deposition. Furthermore, the exposed ion energy absorbing layer 8 is preferably chosen of materials having high secondary electron emitting properties.

While I have described the preferred modification of a structure embodying my invention, the energy absorbing layer 8 may be deposited directly upon the exposed surface of the phosphor coating 6 by a method which insures the formation of a barrier-phosphor interface which inhibits the migration of ions. The interface between a phosphor and a condensed film or layer of aluminum oxide exhibits this property. Thus a tube prepared with an evaporated and condensed layer of aluminum oxide on the exposed surface of the phosphor produced a substantially imperceptible ion spot and no smudge whatsoever even at the end of 150 hours of life, whereas conventional tubes utilizing either a bare phosphor screen or one coated only with a thin film of metal allow formation of ion spot after only an hour's operation. While I do not wish to be limited to any particular theory as to the formation of the barrier-phosphor interface, it appears that when an insulating substance such as aluminum oxide is deposited from the vapor phase, such a barrier layer is formed possibly by reason of the discontinuity in the crystal lattice at the interface between the two dissimilar materials.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

I claim:

1. An electric discharge device including an electron source to develop electrons, said electrons inherently developing ions, a luminescent phosphor screen of material subject to damage by ions, a layer of non-metallic electron permeable material supported by said screen and between said screen and said source to intercept said ions and means comprising an intermediate ion barrier layer between said first-mentioned layer and said screen to prevent migration of ions into said screen.

2. An electron discharge device comprising an evacuated envelope containing residual gas, an electron source to develop electrons which in the presence of said gas liberate ions, a luminescent phosphor screen exposed to electrons from said source, a layer of a metal oxide supported by said screen of sufficient thickness to absorb ions but of insufficient thickness to prevent said electrons reaching said screen and an intermediate film between said screen and said layer, said film being of material capable of reacting chemically with said ions whereby migration of ions into said screen is substantially prevented.

3. An electron discharge device comprising an evacuated envelope containing residual ionizable gas, an electron source within said envelope, a luminescent phosphor screen of material subject to damage by ions inherently formed by electrons developed by said source, a plurality of separately deposited layers of electron permeable material on said screen, the exposed layer being of sufficient thickness to absorb the bombarding energy of ions incident thereon and the material of the intermediate layer having small atomic radii to impede the migration of ions into said screen.

4. An electron discharge device comprising an evacuated envelope containing a trace of an ionizable gas, an electron source to develop electrons within said envelope, a luminescent screen including a sulphide phosphor to receive electrons from said source, a metal oxide layer having a predetermined thickness sufficient to absorb the bombarding energy of ions inherently developed by gas ionization supported from said screen and removed from contact therewith and an independently deposited metal layer intermediate said first-mentioned layer and said screen to prevent substantial migration of ions into the sulphide phosphor material of said screen.

5. A device as claimed in claim 4 wherein said metal oxide layer is from 2 to 5 times thicker than said metal layer.

6. In combination with a cathode ray tube having a luminescent sulphide screen and a source of electrons, an electrically insulating layer adjacent said sulphide screen to absorb the energy of ions inherently developed by said electrons, and a chemically active metal film between said insulating layer and said sulphide screen adapted to chemically react with ions penetrating said insulating layer thereby substantially preventing migration of ions into said screen.

7. A luminescent screen assembly adapted to be subjected to an electron and ion discharge comprising a foundation member, a coating of a luminescent phosphor on said foundation member, an ion barrier layer adjacent said coating comprising a thin film of metal and a separate individual layer of metal oxide deposited from the vapor state on said barrier layer to absorb the bombarding energy of ions, said layer and said film being of insufficient thickness to be opaque to electrons.

8. A cathode ray tube including an electron gun to develop an electron beam of predetermined velocity and a luminescent screen assembly comprising a foundation member, a luminescent phosphor coating on said member, a metal film of from 5 to 10 molecules in thickness adjacent said phosphor coating, and a metal oxide layer on said metal film having a thickness of from 1 to 5 molecules per thousand volts velocity of said electron beam to absorb the bombarding energy of ions formed by said electron beam and incident thereon said metal film preventing said ions from migrating into said phosphor coating.

9. A luminescent screen assembly comprising a foundation member, a coating of a luminescent phosphor adapted to luminesce under electron excitation on said foundation, a layer of aluminum oxide adjacent said coating and an intermediate separately deposited metal film between said coating and said layer to prevent substantial migration of ions into said coating.

RUSSELL R. LAW.